US011972715B2

(12) United States Patent
Kim et al.

(10) Patent No.: US 11,972,715 B2
(45) Date of Patent: Apr. 30, 2024

(54) DISPLAY APPARATUS

(71) Applicant: LG DISPLAY CO., LTD., Seoul (KR)

(72) Inventors: Jihun Kim, Paju-si (KR); Joon-Min Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,389

(22) Filed: Oct. 31, 2022

(65) Prior Publication Data

US 2023/0206803 A1 Jun. 29, 2023

(30) Foreign Application Priority Data

Dec. 28, 2021 (KR) ........................ 10-2021-0189821

(51) Int. Cl.
*G09G 3/20* (2006.01)

(52) U.S. Cl.
CPC ....... *G09G 3/20* (2013.01); *G09G 2300/0452* (2013.01); *G09G 2300/0842* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2016/0062201 A1* 3/2016 Lim ...................... H01L 27/124 257/773
2020/0089067 A1* 3/2020 Song ................. G02F 1/136286

* cited by examiner

*Primary Examiner* — Ifedayo B Iluyomade
(74) *Attorney, Agent, or Firm* — POLSINELLI PC

(57) ABSTRACT

A display apparatus includes a display panel including data lines extending in a first direction, gate lines extending in a second direction which differs from the first direction, and unit pixels connected to the data lines and the gate lines, wherein each of the unit pixels includes a white pixel and a plurality of color pixels, an $n^{th}$ white pixel arranged at an $n^{th}$ position among white pixels arranged in the first direction is connected to an odd white data line (where n is an odd number), and an $n+1^{th}$ white pixel arranged at an $n+1^{th}$ position among white pixels arranged in the first direction is connected to an even white data line.

19 Claims, 6 Drawing Sheets

DISPLAY APPARATUS

CROSS-REFERENCE TO RELATED APPLICATION

This application claims the priority of Korean Patent Application No. 10-2021-0189821 filed on Dec. 28, 2021, which is hereby incorporated by reference in its entirety.

BACKGROUND

Field of the Disclosure

The present disclosure relates to a display apparatus.

Description of the Background

In order to enhance the quality of display apparatuses, a driving frequency of the display apparatuses is progressively increasing.

However, although display apparatuses are manufacturing for high frequency driving, the display apparatuses need to be driven at a low frequency for other applications.

Particularly, in all of a case where a display apparatus is driven at a low frequency and a case where a display apparatus is driven at a high frequency, when pixels included in display apparatuses are independently driven, the quality of display apparatuses can be enhanced. However, the conventional display apparatuses have not been able to be driven in this manner.

SUMMARY

Accordingly, the present disclosure is directed to providing a display apparatus that substantially obviates one or more problems due to limitations and disadvantages s described above.

More specifically, the present disclosure is to provide a display apparatus in which the same data voltages may be supplied to adjacent color pixels along a data line when the display apparatus is driven at a high frequency, and when the display apparatus is driven at a low frequency, different data voltages may be supplied to adjacent color pixels along a data line.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display apparatus includes a display panel including a plurality of data lines extended in a first direction, a plurality of gate lines extended in a second direction, and a plurality of unit pixels connected to the plurality of data lines and the plurality of gate lines, wherein each unit pixel includes a white pixel and a plurality of color pixels, an nth white pixel (n being an odd number) among a plurality of white pixels arranged in the first direction is connected to an odd white data line, and an $(n+1)^{th}$ white pixel among the plurality of white pixels arranged in the first direction is connected to an even white data line.

In another aspect of the present disclosure, a display apparatus includes a first white pixel and a first group of first, second and third color pixels disposed in a first direction; a second white pixel and a second group of first, second and third color pixels disposed in the first direction; a first white data line connected to the first white pixel; a second white data line connected to the second white pixel; first, second and third color data lines extended in a second direction and respectively connected to the first, second and third color pixels in the first group and the first, second and third color pixels in the second group, wherein the first color pixels in the first and second groups are supplied with different data voltages when the display apparatus is driven at a first frequency, and wherein the first color pixels in the first and second groups are supplied with a same data voltage when the display apparatus is driven at a second frequency higher than the first frequency.

According to the present disclosure, the second color pixels in the first and second groups are supplied with different data voltages when the display apparatus is driven at the first frequency.

According to the present disclosure, the third color pixels in the first and second groups are supplied with different data voltages when the display apparatus is driven at the first frequency.

According to the present disclosure, the second color pixels in the first and second groups are supplied with the same data voltages when the display apparatus is driven at the second frequency.

According to the present disclosure, the third color pixels in the first and second groups are supplied with the same data voltages when the display apparatus is driven at the second frequency.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
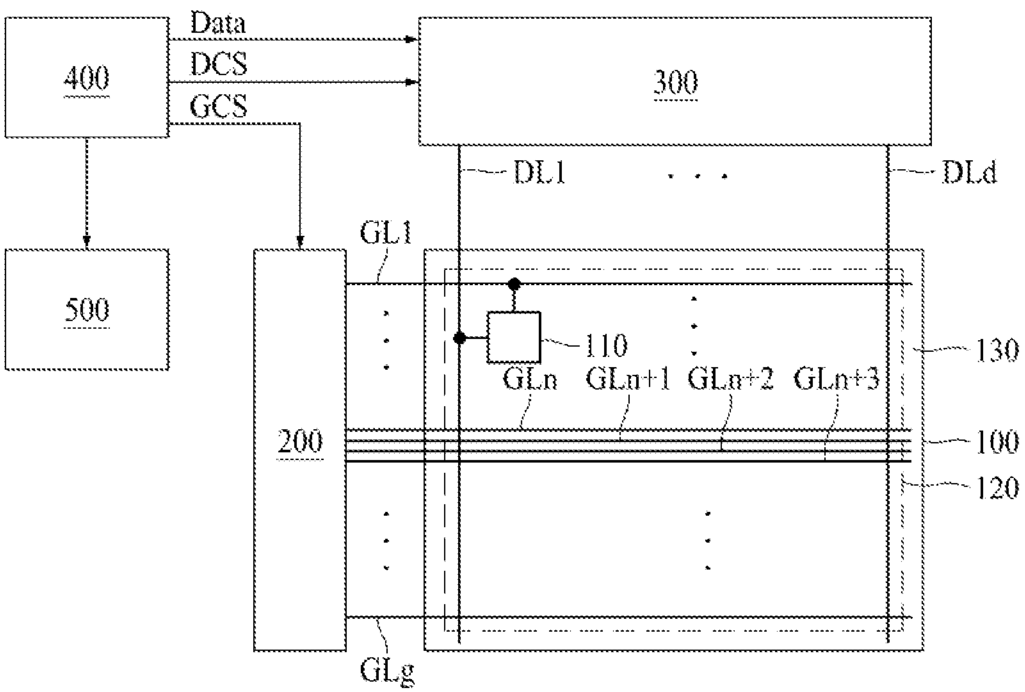
FIG. 1 is an exemplary diagram illustrating a configuration of a display apparatus according to the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
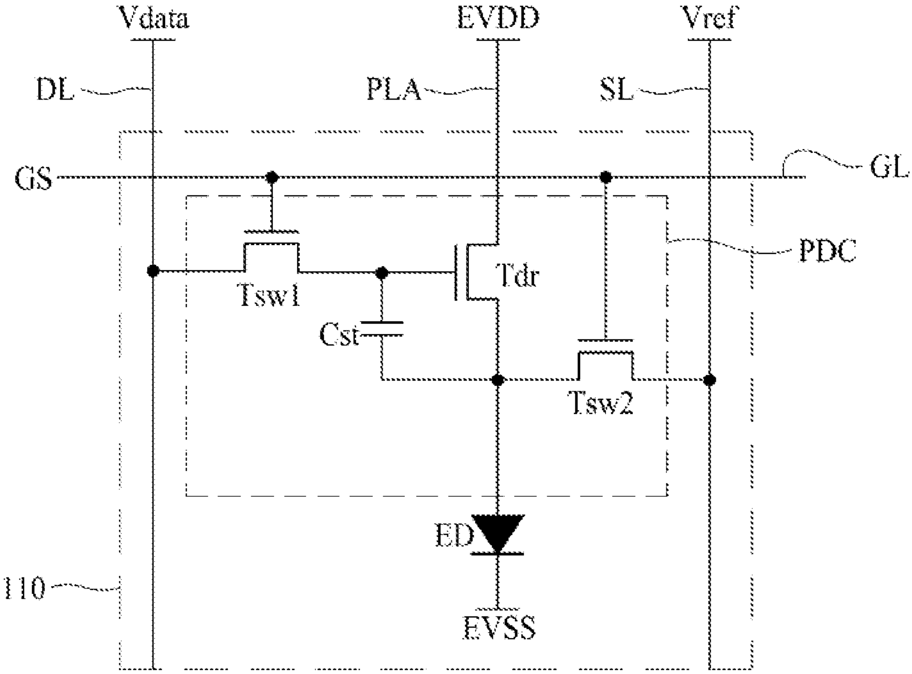
FIG. 2 is an exemplary diagram illustrating a structure of a pixel applied to a display apparatus according to the present disclosure.
Figure 3:
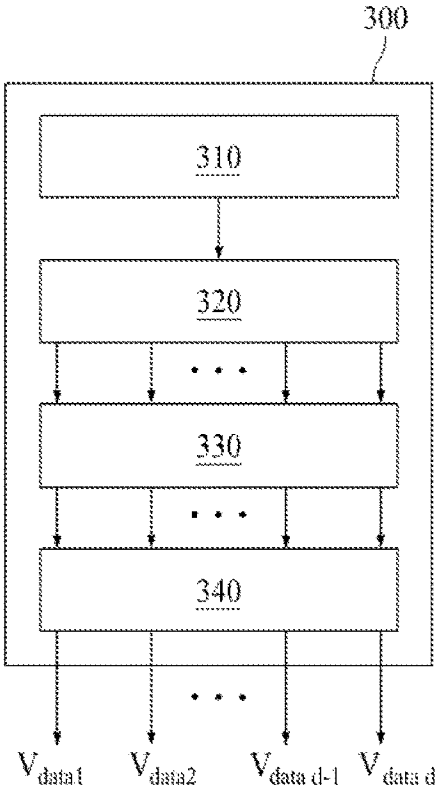
FIG. 3 is an exemplary diagram illustrating a configuration of a data driver applied to a display apparatus according to the present disclosure.
Figure 4:
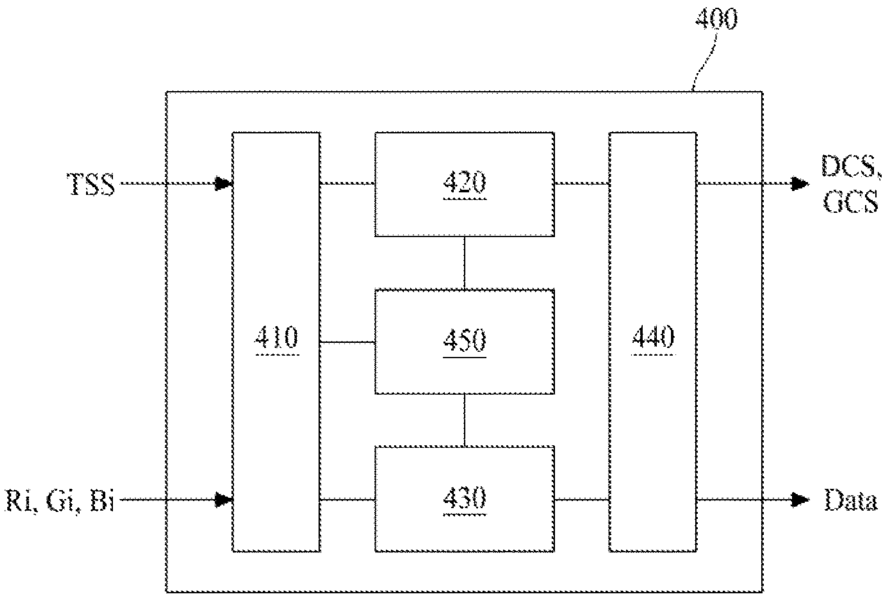
FIG. 4 is an exemplary diagram illustrating a configuration of a controller applied to a display apparatus according to the present disclosure.
Figure 5:
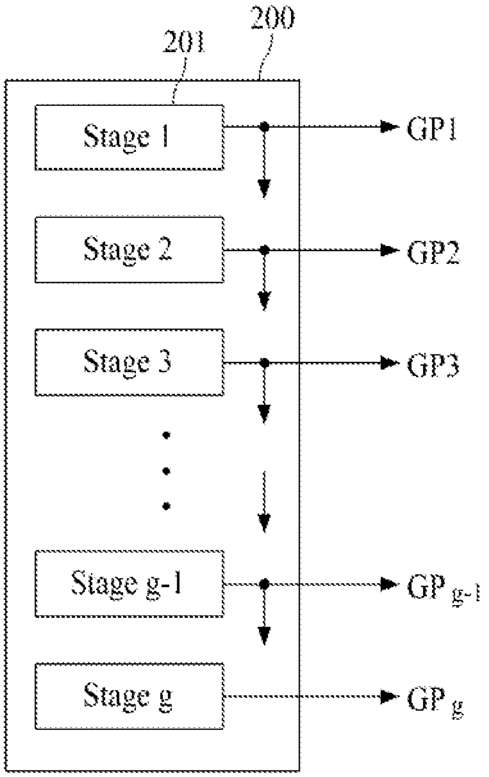
FIG. 5 is an exemplary diagram illustrating a configuration of a gate driver applied to a display apparatus according to the present disclosure.

FIG. 1 is an exemplary diagram illustrating a configuration of a display apparatus according to the present disclosure. FIG. 2 is an exemplary diagram illustrating a structure of a pixel for a display apparatus according to the present disclosure. FIG. 3 is an exemplary diagram illustrating a configuration of a data driver for a display apparatus according to the present disclosure. FIG. 4 is an exemplary diagram illustrating a configuration of a controller for a display apparatus according to the present disclosure. FIG. 5 is an exemplary diagram illustrating a configuration of a gate driver for a display apparatus according to the present disclosure.

The display apparatus according to the present disclosure may be applicable for various electronic devices such as smartphones, tablet personal computers (PCs), televisions (TVs), and monitors.

The display apparatus according to the present disclosure, as illustrated in FIG. 1, may include a display panel 100 which includes a display area 120 displaying an image and a non-display area 130 provided outside the display area 120, a gate driver 200 which supplies a gate signal to a plurality of gate lines GL1 to GLg provided in the display area 120 of the display panel 100, a data driver 300 which supplies data voltages to a plurality of data lines DL1 to DLd provided in the display panel 100, a controller 400 which controls driving of the gate driver 200 and the data driver 300, and a power supply 500 which supplies power to the controller 400, the gate driver 200, the data driver 300, and the display panel 100.

More specifically, the display panel 100 may include the display area 120 and the non-display area 130. The gate lines GL1 to GLg, the data lines DL1 to DLd, and the pixels 110 may be disposed in the display area 120 (g and d being natural numbers). Accordingly, the display area 120 displays an image. The non-display area 130 may surround an outer portion of the display area 120.

The pixel 110 included in the display panel 100, as illustrated in FIG. 2, may include an emission area which includes a pixel driving circuit PDC, including a switching transistor Tsw1, a storage capacitor Cst, a driving transistor Tdr, and a sensing transistor Tsw2, and a light emitting device ED.

A first terminal of the driving transistor Tdr may be connected to a high voltage supply line PLA through which a high voltage EVDD is supplied, and a second terminal of the driving transistor Tdr may be connected to the light emitting device ED.

A first terminal of the switching transistor Tsw1 may be connected to the data line DL, a second terminal of the switching transistor Tsw1 may be connected to a gate of the driving transistor Tdr, and a gate of the switching transistor Tsw1 may be connected to a gate line GL.

A data voltage Vdata may be supplied to a data line DL, and a gate signal GS may be supplied to the gate line GL.

The sensing transistor Tsw2 may be provided for measuring a threshold voltage or mobility of the driving transistor. A first terminal of the sensing transistor Tsw2 may be connected to a second terminal of the driving transistor Tdr and the light emitting device ED, a second terminal of the sensing transistor Tsw2 may be connected to a sensing line SL through which a reference voltage Vref is supplied, and a gate of the sensing transistor Tsw2 may be connected to a sensing control line through which a sensing control signal is supplied.

The sensing line SL may be connected to the data driver 300 and may be connected to the power supply 500 through the data driver 300. That is, the reference voltage Vref supplied from the power supply 500 may be supplied to the pixels through the sensing line SL, and sensing signals transferred from the pixels may be processed by the data driver 300.

In this case, the gate line GL may perform a function of the sensing control line. That is, the gate of the sensing transistor Tsw2 and the gate of the switching transistor Tsw1, as illustrated in FIG. 2, may be connected to the gate line GL in common. Accordingly, the gate signal GS may be used as a sensing control signal.

However, the sensing control line may be a separate line which is independent from the gate line GL, and the sensing control signal may be supplied through the separately provided sensing control line.

A structure of the pixel 110 applied to the present disclosure is not limited to a structure illustrated in FIG. 2. Accordingly, the structure of the pixel 110 may be modified to various types for different applications.

Moreover, the present disclosure may be applied to a liquid crystal display apparatus including a liquid crystal display panel, in addition to a light emitting display apparatus including the light emitting device illustrated in FIG. 2. That is, the present disclosure may be applied to various kinds of display apparatuses which are being currently used. Hereinafter, however, for convenience of description, a light emitting display apparatus will be described as an example of the present disclosure.

The data driver 300 may be mounted on a chip on film (COF) attached on the display panel 100, or may be directly attached on the display panel 100.

The data driver 300 may supply data voltages Vdata to the data lines DL1 to DLd.

The data driver 300 may convert a sensing signal, received through the sensing line SL, into a digital signal and may transfer the digital signal to the controller 400.

The data driver 300 may shift a source start pulse transferred from the controller 400 on the basis of a source shift clock to generate a sampling signal. Also, the data driver 300 may latch image data on the basis of the sampling signal, convert the image data into data voltages, and supply the data lines with the data voltages corresponding to a gate line unit in response to a source output enable signal.

To this end, as illustrated in FIG. 3, the data driver 300 may include a shifter register unit 310, a latch unit 320, a digital-to-analog converter (DAC) 330, and an output buffer 340.

The shift register unit 310 may output the sampling signal by using data control signals DCS received from the controller 400.

The latch unit 320 may latch image data Data sequentially received from the controller 400, and then, may simultaneously output the image data Data to the DAC 330 on the basis of the sampling signal.

The DAC 330 may simultaneously convert the image data Data, transferred from the latch unit 320, into data voltages Vdata1 to Vdata(d).

The output buffer 340 may simultaneously output the data voltages Vdata1 to Vdata(d), transferred from the DAC 330, to the data lines DL1 to DLd of the display panel on the basis of the source output enable signal transferred from the controller 400.

The controller 400 may realign input video data transferred from an external system by using a timing synchronization signal transferred from the external system and may generate data control signals DCS which are to be supplied to the data driver 300 and gate control signals GCS which are to be supplied to the gate driver 200.

To this end, the controller 400 may include a data aligner 430 which realigns input video data to generate image data Data and supplies the image data Data to the data driver 300, a control signal generator 420 which generates the gate control signal GCS and the data control signal DCS by using the timing synchronization signal, an input unit 410 which receives the timing synchronization signal and the input video data transferred from the external system and respectively transfers the timing synchronization signal and the input video data to the data aligner and the control signal generator, and an output unit which supplies the data driver 300 with the image data Data generated by the data aligner and the data control signal DCS generated by the control signal generator and supplies the gate driver 200 with the gate control signals GCS generated by the control signal generator.

The controller 400 may include a storage unit 450 for storing various information.

The external system may perform a function of driving the controller 400 and an electronic device. For example, when the electronic device is a TV, the external system may receive various sound information, video information, and letter information over a communication network and may transfer the received video information to the controller 400. In this case, the image information may include input video data.

The power supply 500 may generate various powers and may supply the generated powers to the controller 400, the gate driver 200, the data driver 300, and the display panel 100.

Finally, the gate driver 200 may be configured as an integrated circuit (IC) and mounted in the non-display area 130. Also, the gate driver 200 may be directly embedded in the non-display area 130 by using a gate in panel (GIP) type. In a case which uses the GIP type, transistors configuring the gate driver 200 may be provided in the non-display area through the same process as transistors included in each of the pixels 110.

The gate driver 200 may supply gate pulses GP1 to GPg to the gate lines GL1 to GLg. When the gate pulse generated by the gate driver 200 is supplied to the gate of the switching transistor Tsw1 included in the pixel 110, the switching transistor Tsw1 may be turned on. When the switching transistor Tsw1 is turned on, a data voltage supplied through a data line may be supplied to the pixel 110. When a gate off signal generated by the gate driver 200 is supplied to the switching transistor Tsw1, the switching transistor Tsw1 may be turned off. When the switching transistor Tsw1 is turned off, a data voltage may not be supplied to the pixel 110 any longer. The gate signal GS supplied to the gate line GL may include the gate pulse GP and the gate off signal.

To this end, as illustrated in FIG. 5, the gate driver 200 may include a plurality of stages 201.

Each of the stages 201 may be connected to at least one gate line GL. Each of the stages 201 may be driven by a start signal transferred from the controller 400, or may be driven by a start signal transferred from a previous stage or a next stage.

Each of the stages 201 may include at least two transistors and may be configured in various forms.

Figure 6:
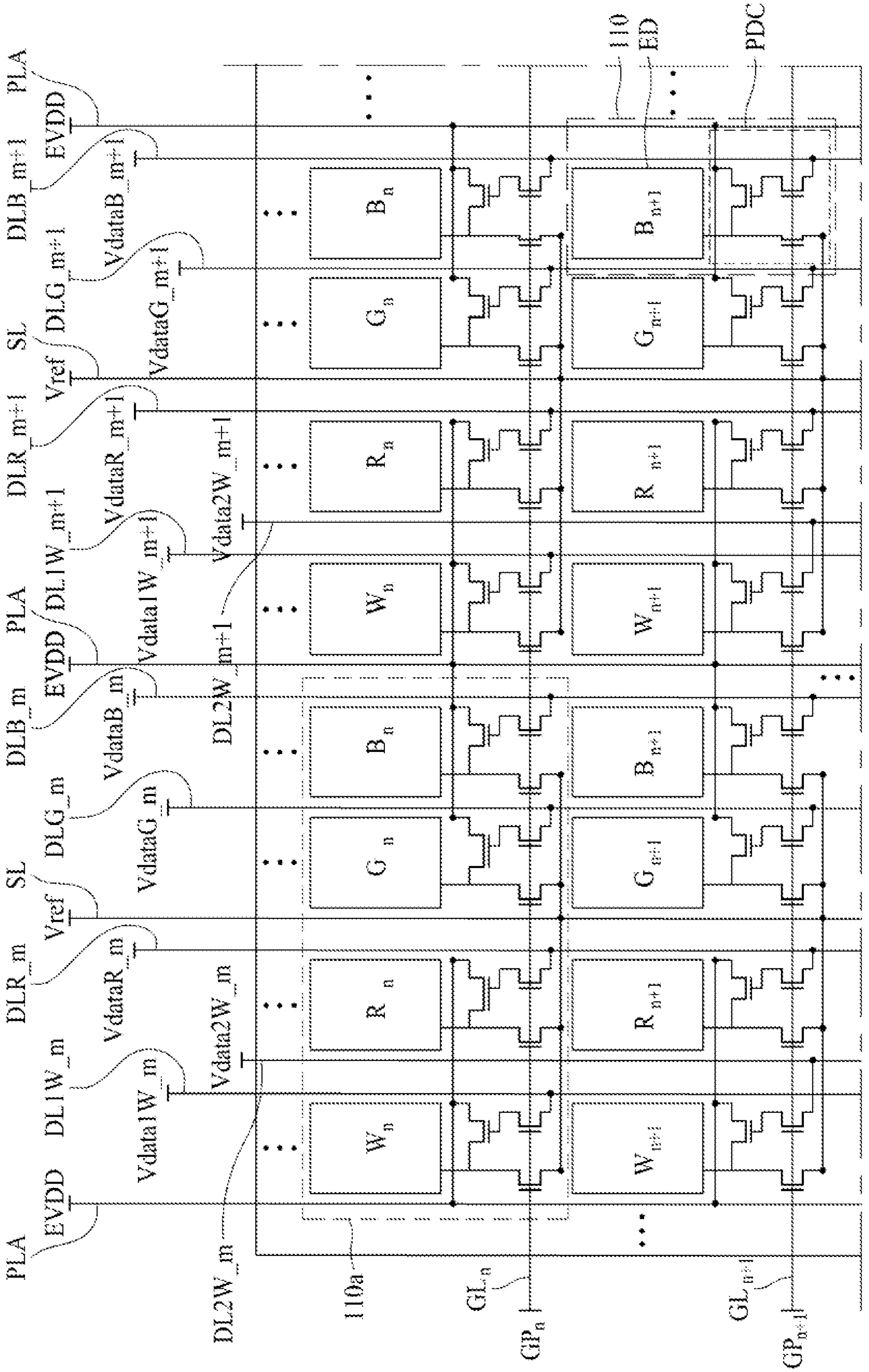
FIG. 6 is an exemplary diagram illustrating a display panel applied to a display apparatus according to the present disclosure.

FIG. 6 is an exemplary diagram illustrating a display panel applied to a display apparatus according to the present disclosure. Particularly, FIG. 6 is an exemplary diagram illustrating two unit pixels 110*a* connected to an $n^{th}$ gate line GLn and two unit pixels 110*a* connected to an $n+1^{th}$ gate line GLn+1. That is, in FIG. 6, four unit pixels connected to the $n^{th}$ gate line GLn and the $n+1^{th}$ gate line GLn+1 in the light emitting display panel illustrated in FIG. 1 are illustrated. Here, n may be an odd number which is less than an even number. Hereinafter, a structure of the display panel applied to the present disclosure will be described with reference to FIG. 6.

The display apparatus according to the present disclosure, as illustrated in FIGS. 1 and 6, may include a display panel 100 which includes data lines DL and gate lines GL.

The display panel 100 may include data lines DL1 to DLd extending in a first direction and gate lines GL1 to GLg extending in a second direction which differs from the first direction.

The first direction, for example, may be a lengthwise direction of the display panel 100 illustrated in FIGS. 1 and 6, and the second direction, for example, may be a widthwise direction of the display panel 100 illustrated in FIGS. 1 and 6. That is, in FIGS. 1 and 6, the first direction may be a direction in which a data line DL extends, and the second direction may be a direction in which a gate line GL extends.

The display panel 100 may include unit pixels 110*a* which are connected to the data lines DL and the gate lines GL.

Each of the unit pixels 110*a* may include a white pixel W, a red pixel R, a green pixel G, and a blue pixel G. However, a combination of pixels configuring the unit pixel 110*a* is not limited to the white pixel W, the red pixel R, the green pixel G, and the blue pixel G. Accordingly, the unit pixel 110*a* may be configured by a combination of various colors.

Hereinafter, for convenience of description, a display panel 100 including the unit pixel 110*a* including the white pixel W, the red pixel R, the green pixel G, and the blue pixel G will be described as an example of the present disclosure. In this case, each of the red pixel R, the green pixel G, and the blue pixel G may be described as a color pixel. That is, each of the other pixels except the white pixel may be a color pixel. Hereinafter, therefore, a unit pixel may include a white pixel and three color pixels.

To provide an additional description, in FIG. 6, the two unit pixels 110*a* connected to the $n^{th}$ gate line GLn and the two unit pixels 110*a* connected to the $n+1^{th}$ gate line GLn+1 are illustrated.

In this case, an $n^{th}$ white pixel Wn arranged at an $n^{th}$ position among white pixels W arranged in the first direction may be connected to an odd white data line DL1W, and an $n+1^{th}$ white pixel Wn+1 arranged at an $n+1^{th}$ position among the white pixels W arranged in the first direction may be connected to an even white data line DL2W.

Moreover, red pixels R arranged in the first direction may be connected to a red data line DLR, green pixels G arranged in the first direction may be connected to a green data line DLG, and blue pixels B arranged in the first direction may be connected to a blue data line DLB.

For example, in the display panel 100 illustrated in FIG. 6, the $n^{th}$ white pixel Wn connected to the $n^{th}$ gate line GLn among the white pixels W arranged in the first direction may be connected to an $m^{th}$ odd white data line DL1W_m, and the $n+1^{th}$ white pixel Wn+1 connected to the $n+1^{th}$ gate line GLn+1 among the white pixels W arranged in the first direction may be connected to an $m^{th}$ even white data line DL2W_m. Here, m may be a natural number which is less than d. That is, m represents the order of data lines. Therefore, in the following description, when the order is not needed, m or n may be omitted in reference numerals.

That is, in the present disclosure, the $n^{th}$ white pixel Wn connected to the $n^{th}$ gate line GLn and the $n+1^{th}$ white pixel Wn+1 connected to the $n+1^{th}$ gate line GLn+1 among two pixels adjacent to each other along the data line DL may be connected to different data lines.

In this case, red pixels R arranged in the first direction may be connected to an $m^{th}$ red data line DLR_m, green pixels G arranged in the first direction may be connected to an $m^{th}$ green data line DLG_m, and blue pixels B arranged in the first direction may be connected to an $m^{th}$ blue data line DLB_m.

That is, in the present disclosure, red pixels R adjacent to each other along the data line DL may be connected to one red data line DLR, green pixels G may be connected to one green data line DLG, and blue pixels B may be connected to one blue data line DLB.

Figure 7:
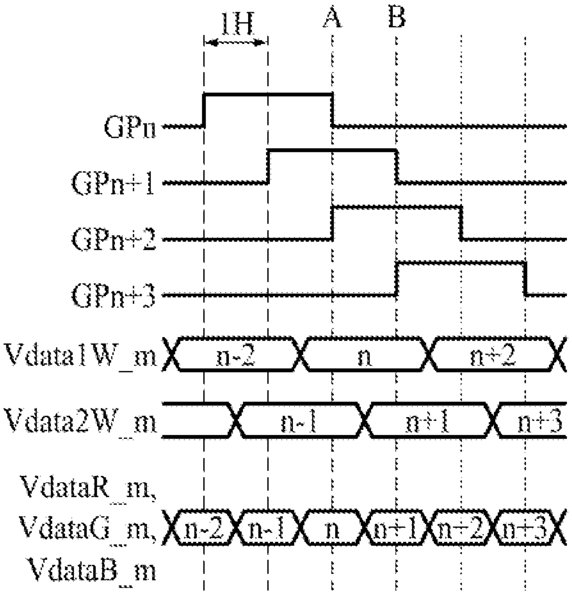
FIG. 7 is an exemplary diagram showing waveforms applied to the present disclosure when a display apparatus according to the present disclosure is driven at a low frequency.

FIG. 7 is an exemplary diagram showing waveforms applied to the present disclosure when a display apparatus according to the present disclosure is driven at a low frequency. Hereinafter, a method of driving the display apparatus according to the present disclosure at the low frequency will be described with reference to FIGS. 6 and 7. Here, the low frequency may denote a frequency which is lower than a high frequency described below with reference to FIG. 8 and may be, for example, 120 Hz or 60 Hz. Therefore, the high frequency described below with reference to FIG. 8 may be, for example, 240 Hz.

Hereinabove, as described above with reference to FIG. 6, in a display panel applied to the present disclosure, an $n^{th}$ white pixel Wn arranged at an $n^{th}$ position among white pixels W arranged in a first direction may be connected to an odd white data line DL1W, and an $n+1^{th}$ white pixel Wn+1 arranged at an $n+1^{th}$ position among the white pixels W arranged in the first direction may be connected to an even white data line DL2W (where n is an odd number). In this case, red pixels R arranged in the first direction may be connected to a red data line DLR, green pixels G arranged in the first direction may be connected to a green data line DLG, and blue pixels B arranged in the first direction may be connected to a blue data line DLB.

In this case, when the display panel 100 is driven at a first frequency, as shown in FIGS. 6 and 7, a data voltage Vdata1W supplied to the odd white data line DL1W may have a width of two horizontal periods 2H, a data voltage Vdata2W supplied to the even white data line DL2W may have a width of two horizontal periods 2H, data voltages VdataR, VdataG, and VdataB respectively supplied to a red pixel R, a green pixel G, and a blue pixel B may have a width of one horizontal period 1H, and gate pules GPn, GPn+1, GPn+2, and GPn+3 respectively supplied to gate lines may have a width of two horizontal periods 2H.

Here, as described above, the first frequency may denote a frequency which is lower than the high frequency described below with reference to FIG. 8, and for example, may be 120 Hz or 60 Hz. Hereinafter, a display apparatus driven at a frequency of 120 Hz will be described as an example of the present disclosure with reference to FIG. 7.

Hereinafter, as shown in FIG. 7, the present disclosure will be described with reference to $n^{th}$ to $n+3^{th}$ gate pulses GPn to GPn+3 supplied to $n^{th}$ to $n+3^{th}$ gate lines GLn to GLn+3.

Hereinafter, as shown in FIG. 7, the present disclosure will be described with reference to an $m^{th}$ odd white data voltage Vdata1W_m supplied to an $m^{th}$ odd white data line DL1W_m, an $m^{th}$ even white data voltage Vdata2W_m supplied to an $m^{th}$ even white data line DL2W_m, and an $m^{th}$ red data voltage VdataR_m, an $m^{th}$ green data voltage VdataG_m, and an $m^{th}$ blue data voltage VdataB_m respectively supplied to an $m^{th}$ red data line DLR_m, an $m^{th}$ green data line DLG_m, and an $m^{th}$ blue data line DLB_m.

In this case, in FIG. 7, n illustrated in each of data voltages Vdata1W_m, Vdata2W_m, VdataR_m, VdataG_m, and VdataB_m may denote a data voltage corresponding to an $n^{th}$ gate line GLn, n+1 may denote a data voltage corresponding to an $n+1^{th}$ gate line GLn+1, n+2 may denote a data voltage corresponding to an $n+2^{th}$ gate line GLn+2, and n+3 may denote a data voltage corresponding to an n+3th gate line GLn+3. Likewise, n−1 may denote a data voltage corresponding to an $n-1^{th}$ gate line GLn−1, n−2 may denote a data voltage corresponding to an $n-2^{th}$ gate line GLn−2, and n−3 may denote a data voltage corresponding to an $n-3^{th}$ gate line GLn−3.

For example, when the display panel 100 is driven at a first frequency (120 Hz), as shown in FIG. 7, the $m^{th}$ odd white data voltage Vdata1W_m supplied to the $m^{th}$ odd white data line DL1W_m may have a width of two horizontal periods 2H. The $m^{th}$ even white data voltage Vdata2W_m supplied to the $m^{th}$ even white data line DL2W_m may have a width of two horizontal periods 2H. The $m^{th}$ red data voltage VdataR_m, the $m^{th}$ green data voltage VdataG_m, and the $m^{th}$ blue data voltage VdataB_m respectively supplied to a red pixel R, a green pixel G, and a blue pixel B through the $m^{th}$ red data line DLR_m, the $m^{th}$ green data line DLG_m, and the $m^{th}$ blue data line DLB_m may have a width of one horizontal period. The gate pulses GPn, GPn+1, GPn+2, and GPn+3 supplied to gate lines may have a width of two horizontal periods 2H.

In this case, two gate pulses which are continuously output may overlap by one horizontal period 1H each. For example, in FIG. 7, the $n^{th}$ gate pulse GPn and the $n+1^{th}$ gate pulse GPn+1 may overlap by one horizontal period 1H, the $n+1^{th}$ gate pulse GPn+1 and the $n+2^{th}$ gate pulse GPn+2 may overlap by one horizontal period 1H, and the $n+2^{th}$ gate pulse GPn+2 and the $n+3^{th}$ gate pulse GPn+3 may overlap by one horizontal period 1H.

A size of a width of each of the gate pulses described above and a size of an overlapping width may vary based on a width of each of gate clocks supplied to the gate driver 200 and a size of an overlapping width.

A size of a width of each of the gate clocks supplied to the gate driver 200 and a size of an overlapping width may be varied by the controller 400.

That is, when the display apparatus is configured to be driven at the first frequency which is the low frequency, the controller 400 may generate the gate clocks having a form described above and may transfer the gate clocks to the gate driver 200. Configuration information which enables the display apparatus to be driven at the first frequency may be stored in the storage unit 450.

Therefore, when the display apparatus is turned on, the controller 400 may check the configuration information stored in the storage unit 450, and then, by using timing synchronization signals transferred from the external system, the controller 400 may generate the gate clocks having the form described above and may transfer the gate clocks to the gate driver 200.

In this case, when the $n^{th}$ gate pulse GPn is supplied to the $n^{th}$ gate line GLn and the odd white data voltage Vdata1W is supplied through the odd white data line DL1W to the $n^{th}$ white pixel Wn connected to the $n^{th}$ gate line GLn (n being an odd number), data voltages may be supplied to a red pixel R, a green pixel G, and a blue pixel B, connected to the $n^{th}$ gate line GLn, through the red data line DLR, the green data line DLG, and the blue data line DLB.

For example, as shown in FIGS. 6 and 7, when the $n^{th}$ gate pulse GPn is supplied to the $n^{th}$ gate line GLn and the $m^{th}$ odd white data voltage Vdata1W_m is supplied through the $m^{th}$ odd white data line DL1W_m to the $n^{th}$ white pixel Wn connected to the $n^{th}$ gate line GLn (where n is an odd number), the $m^{th}$ red data voltage VdataR_m, the $m^{th}$ green data voltage VdataG_m, and the $m^{th}$ blue data voltage VdataB_m may be respectively supplied to an $n^{th}$ red pixel Rn, an $n^{th}$ green pixel Gn, and an $n^{th}$ blue pixel Bn, connected to the $n^{th}$ gate line GLn, through the $m^{th}$ red data line DLR_m, the $m^{th}$ green data line DLG_m, and the $m^{th}$ blue data line DLB_m.

To provide an additional description, a timing at which the $n^{th}$ gate pulse GPn is supplied to the $n^{th}$ gate line GLn and the $m^{th}$ odd white data voltage Vdata1W_m is supplied through the $m^{th}$ odd white data line DL1W_m to the $n^{th}$ white pixel Wn connected to the $n^{th}$ gate line GLn is illustrated by A in FIG. 7.

That is, at the timing A, an $m^{th}$ odd white data voltage Vdata1W_m(n) may be supplied to the $n^{th}$ white pixel Wn. Here, (n) may denote a data voltage supplied to the $n^{th}$ white pixel Wn among $m^{th}$ odd white data voltages Vdata1W_m.

In this case, an $m^{th}$ red data voltage VdataR_m(n), an $m^{th}$ green data voltage VdataG_m(n), and an $m^{th}$ blue data voltage VdataB_m(n) may be supplied to an $n^{th}$ red pixel Rn, an $n^{th}$ green pixel Gn, and an $n^{th}$ blue pixel Bn. Here, (n) may denote a data voltage supplied to the $n^{th}$ red pixel Rn, the $n^{th}$ green pixel Gn, and the $n^{th}$ blue pixel Bn among the $m^{th}$ red data voltage VdataR_m(n), the $m^{th}$ green data voltage VdataG_m(n), and the $m^{th}$ blue data voltage VdataB_m(n).

To provide an additional description, data voltages may be simultaneously supplied to the $n^{th}$ white pixel Wn, the $n^{th}$ red pixel Rn, the $n^{th}$ green pixel Gn, and the $n^{th}$ blue pixel Bn connected to the $n^{th}$ gate line GLn at the timing A.

However, an $m^{th}$ even white data voltage Vdata2W_m(n+1) may not be supplied to the $n+1^{th}$ white pixel Wn+1 at the timing A.

When the $n+1^{th}$ gate pulse GPn+1 is supplied to the $n+1^{th}$ gate line GLn+1, the even white data voltage Vdata2W may be supplied to the $n+1^{th}$ white pixel Wn+1, connected to the $n+1^{th}$ gate line GLn+1, through the even white data line DL2W.

For example, as shown in FIGS. 6 and 7, when the $n+1^{th}$ gate pulse GPn+1 is supplied to the $n+1^{th}$ gate line GLn+1, the $m^{th}$ even white data voltage Vdata2W_m may be supplied to the n+1$^{th}$ white pixel Wn+1, connected to the n+1$^{th}$ gate line GLn+1, through the m$^{th}$ even white data line DL2W_m.

To provide an additional description, a timing at which the n+1$^{th}$ gate pulse GPn+1 is supplied to the n+1$^{h}$ gate line GLn+1 and the m$^{th}$ even white data voltage Vdata2W_m is supplied through the m$^{th}$ even white data line DL2W_m to the n+1$^{th}$ white pixel Wn+1 connected to the n+1$^{th}$ gate line GLn+1 is illustrated by B in FIG. 7.

That is, at the timing B, an m$^{th}$ even white data voltage Vdata2W_m(n+1) may be supplied to the n+1$^{th}$ white pixel Wn+1. Here, (n+1) may denote a data voltage supplied to the n+1$^{th}$ white pixel Wn+1 among m$^{th}$ even white data voltages Vdata2W_m.

At the timing B, data voltages may be supplied to a red pixel R, a green pixel G, and a blue pixel B, connected to the n+1$^{th}$ gate line GLn+1, through the red data line DLR, the green data line DLB, and the blue data line DLB.

That is, at the timing B, an m$^{th}$ red data voltage VdataR_m (n+1), an m$^{th}$ green data voltage VdataG_m(n+1), and an m$^{th}$ blue data voltage VdataB_m(n+1) may be supplied to an n+1$^{th}$ red pixel Rn+1, an n+1$^{th}$ green pixel Gn+1, and an n+1$^{th}$ blue pixel Bn+1. Here, (n+1) may denote a data voltage supplied to the n+1$^{th}$ red pixel Rn+1, the n+1$^{th}$ green pixel Gn+1, and the n+1$^{th}$ blue pixel Bn+1 among the m$^{th}$ red data voltage VdataR_m, the m$^{th}$ green data voltage VdataG_m, and the m$^{th}$ blue data voltage VdataB_m.

To provide an additional description, data voltages may be simultaneously supplied to the n+1$^{th}$ white pixel Wn+1, the n+1$^{th}$ red pixel Rn+1, the n+1$^{th}$ green pixel Gn+1, and the n+1$^{th}$ blue pixel Bn+1 connected to the n+1$^{th}$ gate line GLn+1 at the timing B.

As described above, when the display apparatus is driven at the first frequency which is a low frequency, data voltages may be simultaneously supplied to the n$^{th}$ white pixel Wn, the n$^{th}$ red pixel Rn, the n$^{th}$ green pixel Gn, and the n$^{th}$ blue pixel Bn connected to the n$^{th}$ gate line GLn at the timing A, and data voltages may be simultaneously supplied to the n+1$^{th}$ white pixel Wn+1, the n+1$^{th}$ red pixel Rn+1, the n+1$^{th}$ green pixel Gn+1, and the n+1$^{th}$ blue pixel Bn+1 connected to the n+1$^{th}$ gate line GLn+1 at the timing B.

In this case, at different timings, a data voltage may be supplied to the n$^{th}$ white pixel Wn and the n+1$^{th}$ white pixel Wn+1, and different data voltages may be supplied thereto.

Like the white pixels, at different timings, a data voltage may be supplied to the n$^{th}$ red pixel Rn and the n+1$^{th}$ red pixel Rn+1, and different data voltages may be supplied thereto. Also, at different timings, a data voltage may be supplied to the n$^{th}$ green pixel Gn and the n+1$^{th}$ green pixel Gn+1, and different data voltages may be supplied thereto. Also, at different timings, a data voltage may be supplied to the n$^{th}$ blue pixel Bn and the n+1$^{th}$ blue pixel Bn+1, and different data voltages may be supplied thereto.

Therefore, a data voltage corresponding to each of pixels may be supplied to a corresponding pixel of the pixels.

Accordingly, when the display apparatus is driven at the first frequency which is a low frequency, a compensation voltage may be applied to each pixel. Here, the compensation voltage may denote a voltage for compensating for a varied threshold voltage when a threshold voltage of the driving transistor Tdr varies due to a degradation.

That is, according to the present disclosure, the pixels may be individually driven, and thus, a threshold voltage compensation method may be applied to each pixel. Accordingly, the pixels may normally display an image, and thus, the quality of a display apparatus may be enhanced.

Figure 8:
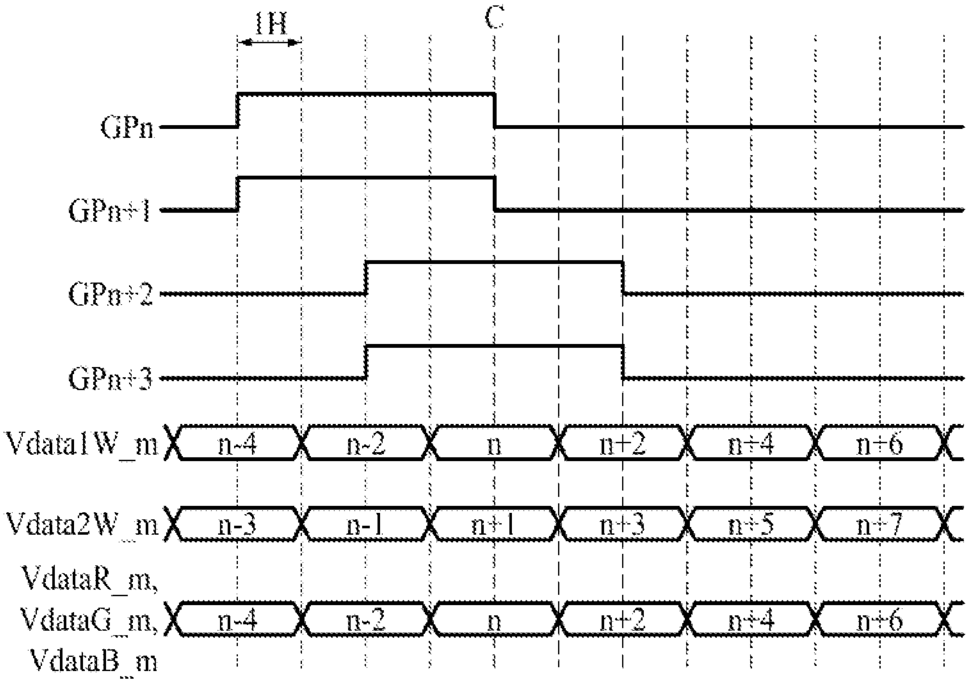
FIG. 8 is an exemplary diagram showing waveforms applied to the present disclosure when a display apparatus according to the present disclosure is driven at a high frequency.

FIG. 8 is an exemplary diagram showing waveforms applied to the present disclosure when a display apparatus according to the present disclosure is driven at a high frequency. Hereinafter, a method of driving the display apparatus according to the present disclosure at the high frequency will be described with reference to FIGS. 6 and 8. Here, the high frequency may denote a frequency which is higher than the low frequency described above with reference to FIG. 7 and may be, for example, 240 Hz. Therefore, in the following description, description which is the same as or similar to the description of FIG. 7 may be omitted or will be briefly given.

Hereinabove, as described above with reference to FIG. 6, in a display panel applied to the present disclosure, an n$^{th}$ white pixel Wn arranged at an n$^{th}$ position among white pixels W arranged in a first direction may be connected to an odd white data line DL1W, and an n+1$^{th}$ white pixel Wn+1 arranged at an n+1$^{th}$ position among the white pixels W arranged in the first direction may be connected to an even white data line DL2W. In this case, red pixels R arranged in the first direction may be connected to a red data line DLR, green pixels G arranged in the first direction may be connected to a green data line DLG, and blue pixels B arranged in the first direction may be connected to a blue data line DLB.

In this case, when the display panel 100 is driven at a second frequency which is the first frequency, as shown in FIGS. 6 and 8, a data voltage supplied to the odd white data line DL1W may have a width of two horizontal periods 2H, a data voltage supplied to the even white data line DL2W may have a width of two horizontal periods 2H, data voltages respectively supplied to a red pixel R, a green pixel G, and a blue pixel B may have a width of two horizontal periods 2H, and gate pules GPn, GPn+1, GPn+2, and GPn+3 respectively supplied to gate lines may have a width of four horizontal periods 4H.

Here, as described above, the second frequency may denote a frequency which is higher than the low frequency described above with reference to FIG. 7, and for example, may be 240 Hz. Hereinafter, a display apparatus driven at a frequency of 240 Hz will be described as an example of the present disclosure with reference to FIG. 8.

For example, when the display panel 100 is driven at a second frequency (240 Hz), as shown in FIG. 8, an m$^{th}$ odd white data voltage Vdata1W_m supplied to the m$^{th}$ odd white data line DL1W_m may have a width of two horizontal periods 2H. An m$^{th}$ even white data voltage Vdata2W_m supplied to the m$^{th}$ even white data line DL2W_m may have a width of two horizontal periods 2H. An m$^{th}$ red data voltage VdataR_m, an m$^{th}$ green data voltage VdataG_m, and an m$^{th}$ blue data voltage VdataB_m respectively supplied to a red pixel R, a green pixel G, and a blue pixel B through an m$^{th}$ red data line DLR_m, an m$^{th}$ green data line DLG_m, and an m$^{th}$ blue data line DLB_m may have a width of two horizontal periods 2H. The gate pulses GPn, GPn+1, GPn+2, and GPn+3 supplied to gate lines may have a width of four horizontal periods 4H.

In this case, two gate pulses which are continuously output may have the same phase, and two gate pulses each may overlap by two horizontal periods. For example, in FIG. 8, the n$^{th}$ gate pulse GPn and the n+1$^{th}$ gate pulse GPn+1 may have the same phase, the n+1$^{th}$ gate pulse GPn+1 and the n+2$^{th}$ gate pulse GPn+2 may overlap by two horizontal periods, and the n+2$^{th}$ gate pulse GPn+2 and the n+3th gate pulse GPn+3 may have the same phase.

That is, an n$^{th}$ gate pulse GPn output to the n$^{th}$ gate line GLn and an n+1$^{th}$ gate pulse GPn+1 output to the n+1$^{th}$ gate line GLn+1 may have the same phase, an n+2$^{th}$ gate pulse GPn+2 output to the n+2$^{th}$ gate line GLn+2 and an n+3$^{th}$ gate pulse GPn+3 output to the n+3th gate line GLn+3 may have the same phase, and the n$^{th}$ gate pulse GPn and the n+2$^{th}$ gate pulse GPn+2 may overlap during two horizontal periods 2H.

A size of a width of each of the gate pulses described above and a size of an overlapping width may vary based on a width of each of gate clocks supplied to the gate driver 200 and a size of an overlapping width.

A size of a width of each of the gate clocks supplied to the gate driver 200 and a size of an overlapping width may be varied by the controller 400.

That is, when the display apparatus is configured to be driven at the second frequency which is the high frequency, the controller 400 may generate the gate clocks having a form described above and may transfer the gate clocks to the gate driver 200. Configuration information which enables the display apparatus to be driven at the second frequency may be stored in the storage unit 450.

Therefore, when the display apparatus is turned on, the controller 400 may check the configuration information stored in the storage unit 450, and then, by using the timing synchronization signals transferred from the external system, the controller 400 may generate the gate clocks having the form described above and may transfer the gate clocks to the gate driver 200.

In this case, when the n$^{th}$ gate pulse GPn is supplied to the n$^{th}$ gate line GLn and the n+1$^{th}$ gate pulse GPn+1 is supplied to the n+1$^{th}$ gate line GLn+1 (where n is an odd number), an odd white data voltage Vdata1W may be supplied to the n$^{th}$ white pixel Wn connected to the n$^{th}$ gate line GLn, an even white data voltage Vdata2W may be supplied to the n+1$^{th}$ white pixel Wn+1 connected to the n+1$^{th}$ gate line GLn+1, data voltages may be supplied to a red pixel R, a green pixel G, and a blue pixel B, connected to the n$^{th}$ gate line GLn, through the red data line DLR, the green data line DLG, and the blue data line DLB, and data voltages may be supplied to a red pixel R, a green pixel G, and a blue pixel B, connected to the n+1$^{th}$ gate line GLn+1, through the red data line DLR, the green data line DLG, and the blue data line DLB.

For example, as shown in FIGS. 6 and 8, when the n$^{th}$ gate pulse GPn is supplied to the n$^{th}$ gate line GLn and the n+1$^{th}$ gate pulse GPn+1 is supplied to the n+1$^{th}$ gate line GLn+1 (where n is an odd number), an m$^{th}$ odd white data voltage Vdata1W_m may be supplied to the n$^{th}$ white pixel Wn, connected to the n$^{th}$ gate line GLn, through an m$^{th}$ odd white data line DL1W_m, an m$^{th}$ even white data voltage Vdata2W_m may be supplied to the n+1$^{th}$ white pixel Wn+1, connected to the n+1$^{th}$ gate line GLn+1, through an m$^{th}$ even white data line DL2W_m, data voltages VdataR_m, VdataG_m, and VdataB_m may be respectively supplied to an n$^{th}$ red pixel Rn, an n$^{th}$ green pixel Gn, and an n$^{th}$ blue pixel Bn, connected to the n$^{th}$ gate line GLn, through the m$^{th}$ red data line DLR_m, the m$^{th}$ green data line DLG_m, and the m$^{th}$ blue data line DLB_m, and the data voltages VdataR_m, VdataG_m, and VdataB_m may be respectively supplied to an n+1$^{th}$ red pixel Rn+1, an n+1$^{th}$ green pixel Gn+1, and an n+1$^{th}$ blue pixel Bn+1, connected to the n+1$^{th}$ gate line GLn+1, through the m$^{th}$ red data line DLR_m, the m$^{th}$ green data line DLG_m, and the m$^{th}$ blue data line DLB_m.

To provide an additional description, a timing at which the n$^{th}$ gate pulse GPn is supplied to the n$^{th}$ gate line GLn and the n+1$^{th}$ gate pulse GPn+1 is supplied to the n+1$^{th}$ gate line GLn+1 is illustrated by C in FIG. 8.

That is, at the timing A, an m$^{th}$ odd white data voltage Vdata1W_m(n) may be supplied to the n$^{th}$ white pixel Wn, and an m$^{th}$ even white data voltage Vdata2W_m(n+1) may be supplied to the n+1$^{th}$ white pixel Wn+1. In the m$^{th}$ odd white data voltage Vdata1W_m(n), (n) may denote a data voltage supplied to the n$^{th}$ white pixel Wn among m$^{th}$ odd white data voltages Vdata1W_m.

In the m$^{th}$ even white data voltage Vdata2W_m(n+1), (n+1) may denote a data voltage supplied to the n+1$^{th}$ white pixel Wn+1 among m$^{th}$ even white data voltages Vdata2W_m.

In this case, an m$^{th}$ red data voltage VdataR_m(n) may be supplied to an n$^{th}$ red pixel Rn and an n+1$^{th}$ red pixel Rn+1, an m$^{th}$ green data voltage VdataG_m(n) may be supplied to an n$^{th}$ green pixel Gn and an n+1$^{th}$ green pixel Gn+1, and an m$^{th}$ blue data voltage VdataB_m(n) may be supplied to an n$^{th}$ blue pixel Bn and an n+1$^{th}$ blue pixel Bn+1. Here, (n) may denote a data voltage supplied to the n$^{th}$ red pixel Rn, the n$^{th}$ green pixel Gn, and the n$^{th}$ blue pixel Bn among the m$^{th}$ red data voltage VdataR_m(n), the m$^{th}$ green data voltage VdataG_m(n), and the m$^{th}$ blue data voltage VdataB_m(n).

In this case, as shown in FIG. 8, when the n$^{th}$ gate pulse GPn is supplied to the n$^{th}$ gate line GLn, the n+1$^{th}$ gate pulse GPn+1 may be supplied to the n+1$^{th}$ gate line GLn+1, and thus, a data voltage supplied to the n$^{th}$ red pixel Rn may be supplied to the n+1$^{th}$ red pixel Rn+1, a data voltage supplied to the n$^{th}$ green pixel Gn may be supplied to the n+1$^{th}$ green pixel Gn+1, and a data voltage supplied to the n$^{th}$ blue pixel Bn may be supplied to the n+1$^{th}$ blue pixel Bn+1.

Therefore, although the m$^{th}$ red data voltage VdataR_m (n+1), the m$^{th}$ green data voltage VdataG_m(n+1), and the m$^{th}$ blue data voltage VdataB_m(n+1) are shown in FIG. 8, the m$^{th}$ red data voltage VdataR_m(n+1), the m$^{th}$ green data voltage VdataG_m(n+1), and the m$^{th}$ blue data voltage VdataB_m(n+1) may be data voltages supplied to the n+1$^{th}$ red pixel Rn+1, the n+1$^{th}$ green pixel Gn+1, and the n+1$^{th}$ blue pixel Bn+1.

To provide an additional description, at the timing C, an m$^{th}$ odd white data voltage Vdata1W_m may be supplied to the n$^{th}$ white pixel Wn, an m$^{th}$ even white data voltage Vdata2W_m may be supplied to the n+1$^{th}$ white pixel Wn+1, an m$^{th}$ red data voltage VdataR_m(n) may be supplied to an n$^{th}$ red pixel Rn and an n+1$^{th}$ red pixel Rn+1, an m$^{th}$ green data voltage VdataG_m(n) may be supplied to an n$^{th}$ green pixel Gn and an n+1$^{th}$ green pixel Gn+1, and an m$^{th}$ blue data voltage VdataB_m(n) may be supplied to an n$^{th}$ blue pixel Bn and an n+1$^{th}$ blue pixel Bn+1.

That is, at the timing C, different data voltages may be supplied to the n$^{th}$ white pixel Wn and the n+1$^{th}$ white pixel Wn+1.

However, at the timing C, the same data voltage as a data voltage supplied to a red pixel R connected to the n$^{th}$ gate line GLn may be supplied to a red pixel R connected to the n+1$^{th}$ gate line GLn+1.

Moreover, at the timing C, the same data voltage as a data voltage supplied to a green pixel G connected to the n$^{th}$ gate line GLn may be supplied to a green pixel G connected to the n+1$^{th}$ gate line GLn+1.

Moreover, at the timing C, the same data voltage as a data voltage supplied to a blue pixel B connected to the n$^{th}$ gate line GLn may be supplied to a blue pixel B connected to the n+1$^{th}$ gate line GLn+1.

In this case, as described above, a period for which data voltages are charged into pixels may be 2H.

Therefore, a period 2H, for which data voltages are charged into red pixels Rn and Rn+1, green pixels Gn and Gn+1, and blue pixels Bn and Bn+1 in a display apparatus driven by a method shown in FIG. 8, may be longer than a period 1H for which data voltages are charged into red pixels Rn and Rn+1, green pixels Gn and Gn+1, and blue pixels Bn and Bn+1 in a display apparatus driven by a method shown in FIG. 7.

Accordingly, when the method shown in FIG. 8 is applied to a display apparatus driven at a high frequency, a period for which a data voltage is charged into a pixel may increase in the display apparatus driven at the high frequency, and thus, the quality of a display apparatus may be enhanced.

Hereinafter, a detailed example where a display apparatus according to an aspect of the present disclosure is applied will be described with reference to FIG. 9.

Figure 9:
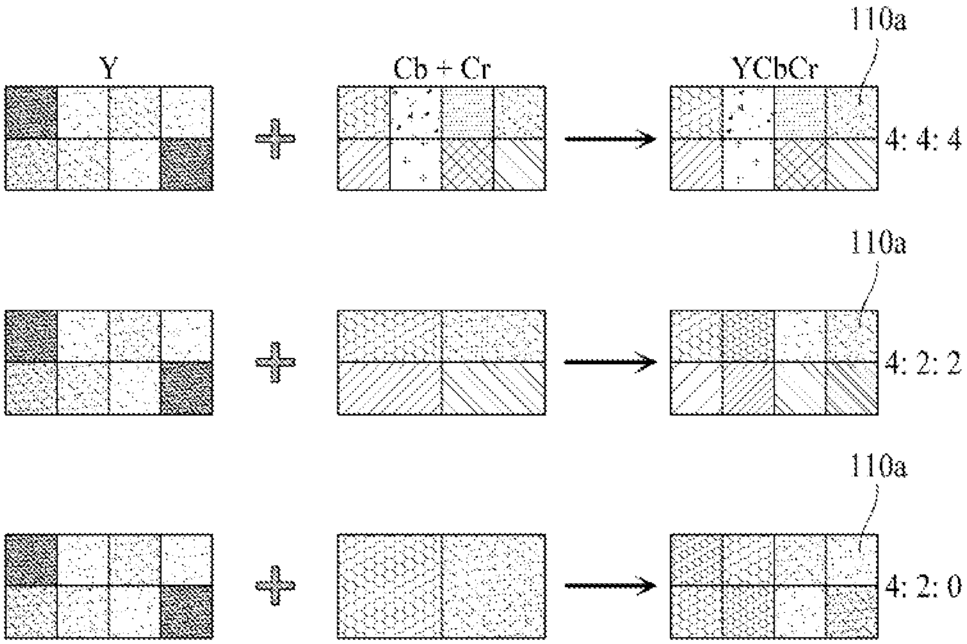
FIG. 9 is an exemplary diagram showing formats of input image data capable of being input to a display apparatus according to the present disclosure is driven at a high frequency.

FIG. 9 is an exemplary diagram showing formats of input image data capable of being input to a display apparatus according to the present disclosure is driven at a high frequency.

Input image data input to the display apparatus may be RGB image data including red data R, green data G, and blue data B.

Moreover, the input image data input to the display apparatus may be YCbCr image data including luminance data Y and chrominance data Cb and Cr. Here, the Cb data may represent a difference Y−B between the luminance data Y and the blue data B, and the Cr data may represent a difference Y−R between the luminance data Y and the red data R.

When the display apparatus is configured with a unit pixel 110*a* including a white pixel W, a red pixel R, a green pixel G, and a blue pixel B, the display apparatus may convert the input RGB image data or the YCbCr image data into a WRGB format.

The RGB image data may use a 4:4:4 format where sampling ratios of all color components are equal, and as illustrated in FIG. 9, the YCbCr image data may use one of a 4:4:4 format, a 4:2:2 format, and a 4:2:0 format on the basis of a sampling ratio of a chrominance component. The 4:4:4 format, the 4:2:2 format, and the 4:2:0 format may be currently and generally used, and thus, descriptions thereof are omitted.

When a display apparatus according to the present disclosure is driven at a low frequency, at least one of the 4:4:4 format, the 4:2:2 format, and the 4:2:0 format may be used. That is, as described above with reference to FIG. 7, in the display apparatus driven at the low frequency, all pixels may be independently driven. Accordingly, at least one of the 4:4:4 format, the 4:2:2 format, and the 4:2:0 format may be used.

Recently, in order to enhance the quality of a display apparatus, a driving frequency of the display apparatus may progressively increase. In a case where the display apparatus is driven at a high frequency, in order to increase a charge ratio of a pixel, the 4:2:0 format may be used where the same data voltages are supplied to two unit pixels adjacent to each other along a data line.

That is, in a case where the 4:2:0 format is used, as described above with reference to FIG. 8, the same data voltage should be supplied to an $n^{th}$ red pixel Rn and an $n+1^{th}$ red pixel Rn+1 adjacent to each other along a data line, the same data voltage should be supplied to an $n^{th}$ green pixel Gn and an $n+1^{th}$ green pixel Gn+1 adjacent to each other along a data line, and the same data voltage should be supplied to an $n^{th}$ blue pixel Bn and an $n+1^{th}$ blue pixel Bn+1 adjacent to each other along a data line.

To provide an additional description, the display apparatus according to the present disclosure may be driven at all of the low frequency and the high frequency. Particularly, when the display apparatus is driven at the low frequency, the display apparatus may use at least one of the 4:4:4 format, the 4:2:2 format, and the 4:2:0 format, and when the display apparatus is driven at the high frequency, the display apparatus may use the 4:2:0 format.

Accordingly, the display apparatus according to the present disclosure may be driven at various frequencies and may be driven by using various formats.

According to the present disclosure, when a display apparatus is driven at a high frequency, the same data voltages may be supplied to two color pixels adjacent to each other along a data line. Accordingly, in the display apparatus driven at the high frequency, a duration where a data voltage is charged into a pixel may increase, and thus, the quality of the display apparatus may be enhanced.

According to the present disclosure, the display apparatus driven at the high frequency may be driven at a low frequency. That is, according to the present disclosure, the display apparatus may be driven at various frequencies on the basis of a selection by a user.

Particularly, when the display apparatus is driven at the low frequency, different data voltages may be supplied to two color pixels adjacent to each other along a data line. Accordingly, the quality of the display apparatus driven at the low frequency may be enhanced.

Moreover, according to the present disclosure, when the display apparatus is driven at the low frequency, different data voltages may be supplied to two color pixels adjacent to each other along a data line, and thus, a compensation method used in the related art may be intactly applied to the present disclosure. Accordingly, a separate compensation method for the display apparatus according to the present disclosure may be needed, and thus, the manufacturing cost of the display apparatus may be reduced.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel including a plurality of data lines extended in a first direction, a plurality of gate lines extended in a second direction, and a plurality of unit pixels connected to the plurality of data lines and the plurality of gate lines, wherein each unit pixel includes a white pixel and a plurality of color pixels, an $n^{th}$ white pixel (n being an odd number) among a plurality of white pixels arranged in the first direction is connected to an odd white data line, and an $(n+1)^{th}$ white pixel among the plurality of white pixels arranged in the first direction is connected to an even white data line, wherein, when the display apparatus is driven at a first frequency, data voltages supplied to adjacent color pixels arranged along the plurality of data lines are different from each other, and when the display apparatus is driven at a second frequency which is higher than the first frequency, the data voltages supplied to adjacent color pixels arranged along the plurality of data lines are the same.

2. The display apparatus of claim 1, wherein the plurality of color pixels includes red, green and blue pixels, the red pixels arranged in the first direction are connected to a red data line, the green pixels arranged in the first direction are connected to a green data line, and the blue pixels arranged in the first direction are connected to a blue data line.

3. A display apparatus comprising:

a display panel including a plurality of data lines extended in a first direction, a plurality of gate lines extended in a second direction, and a plurality of unit pixels connected to the plurality of data lines and the plurality of gate lines, wherein each unit pixel includes a white pixel and a plurality of color pixels, an $n^{th}$ white pixel (n being an odd number) among a plurality of white pixels arranged in the first direction is connected to an odd white data line, and an $(n+1)^{th}$ white pixel among the plurality of white pixels arranged in the first direction is connected to an even white data line, wherein the display panel is driven at a first frequency, data voltages supplied to the odd white data line and the even white data line have a width of two horizontal periods, data voltages supplied to the plurality of color pixels have a width of one horizontal period, and gate pulses supplied to the plurality of gate lines have a width of two horizontal periods.

4. The display apparatus of claim 3, wherein two gate pulses among the gate pulses continuously output and overlap with each other by one horizontal period.

5. The display apparatus of claim 4, wherein the plurality of color pixels includes red, green and blue pixels, the red pixels arranged in the first direction are connected to a red data line, the green pixels arranged in the first direction are connected to a green data line, the blue pixels arranged in the first direction are connected to a blue data line, and the data voltages supplied to the red, green and blue data lines have a width of one horizontal period.

6. The display apparatus of claim 5, wherein, when an $n^{th}$ gate pulse is supplied to an $n^{th}$ gate line, the $n^{th}$ white pixel connected to the $n^{th}$ gate line is supplied with an $n^{th}$ white data voltage through the odd white data line, and the red, green and blue pixels connected to the $n^{th}$ gate line are supplied with $n^{th}$ data voltages through the red, green and blue data lines, respectively.

7. The display apparatus of claim 6, wherein, when an $(n+1)^{th}$ gate pulse is supplied to an $(n+1)^{th}$ gate line, the $(n+1)^{th}$ white pixel connected to the $(n+1)^{th}$ gate line is supplied with an $(n+1)^{th}$ white data voltage through the even white data line, and the red, green and blue pixels connected to the $(n+1)^{th}$ gate line are supplied with $(n+1)^{th}$ data voltages through the red, green and blue data lines, respectively.

8. The display apparatus of claim 3, wherein the $n^{th}$ white pixel and the $(n+1)^{th}$ white pixel are supplied with different data voltages.

9. A display apparatus comprising:

a display panel including a plurality of data lines extended in a first direction, a plurality of gate lines extended in a second direction, and a plurality of unit pixels connected to the plurality of data lines and the plurality of gate lines, wherein each unit pixel includes a white pixel and a plurality of color pixels, an $n^{th}$ white pixel (n being an odd number) among a plurality of white pixels arranged in the first direction is connected to an odd white data line, and an $(n+1)^{th}$ white pixel among the plurality of white pixels arranged in the first direction is connected to an even white data line, wherein the display panel is driven at a second frequency, data voltages supplied to the odd white data line and the even white data line have a width of two horizontal periods, data voltages supplied to the plurality of color pixels have a width of two horizontal periods, and gate pulses supplied to the plurality of gate lines have a width of four horizontal periods.

10. The display apparatus of claim 9, wherein the gate pulses include an $n^{th}$ gate pulse transmitting to an $n^{th}$ gate line, an $(n+1)^{th}$ gate pulse transmitting to an $(n+1)^{th}$ gate line, an $(n+2)^{th}$ gate pulse transmitting to an $(n+2)^{th}$ gate line and an $(n+3)^{th}$ gate pulse transmitting to an $(n+3)^{th}$ gate line, the $n^{th}$ gate pulse and the $(n+1)^{th}$ gate pulse have a same phase, the $(n+2)^{th}$ gate pulse and the $(n+3)^{th}$ gate pulse have a same phase, and the $n^{th}$ gate pulse overlaps with the $(n+1)^{th}$ gate pulse during two horizontal periods.

11. The display apparatus of claim 10, wherein the plurality of color pixels includes red, green and blue pixels, the red pixels arranged in the first direction are connected to a red data line, the green pixels arranged in the first direction are connected to a green data line, the blue pixels arranged in the first direction are connected to a blue data line, and the data voltages supplied to the red, green and blue data lines have a width of two horizontal period.

12. The display apparatus of claim 11, wherein the $n^{th}$ gate pulse is supplied to the $n^{th}$ gate line and the $n+1^{th}$ gate pulse is supplied to the $n+1^{th}$ gate line, an $n^{th}$ white data voltage is supplied through the odd white data line to the $n^{th}$ white pixel connected to the $n^{th}$ gate line, an $(n+1)^{th}$ white data voltage is supplied through the even white data line to the $(n+1)^{th}$ white pixel connected to the $(n+1)^{th}$ gate line, data voltages are supplied through the red, green and blue data lines to the red, blue and green pixels connected to the $n^{th}$ gate line, and data voltages are supplied through the red, green and blue data lines to the red, blue and green pixels connected to the $(n+1)^{th}$ gate line.

13. The display apparatus of claim 9, wherein the $n^{th}$ white pixel and the $(n+1)^{th}$ white pixel are supplied with different data voltages.

14. The display apparatus of claim 9, wherein the plurality of color pixels include red, green and blue pixels, a red pixel connected to the $n^{th}$ gate line and a red pixel connected to the $(n+1)^{th}$ gate line are supplied with a same data voltage, a green pixel connected to the $n^{th}$ gate line and a green pixel connected to the $(n+1)^{th}$ gate line are supplied with a same data voltage, and a blue pixel connected to the $n^{th}$ gate line and a blue pixel connected to the $(n+1)^{th}$ gate line are supplied with a same data voltage.

15. A display apparatus comprising:

a first white pixel and a first group of first, second and third color pixels disposed in a first direction;

a second white pixel and a second group of first, second and third color pixels disposed in the first direction;

a first white data line connected to the first white pixel;

a second white data line connected to the second white pixel;

first, second and third color data lines extended in a second direction and respectively connected to the first, second and third color pixels in the first group and the first, second and third color pixels in the second group, wherein the first color pixels in the first and second groups are supplied with different data voltages when the display apparatus is driven at a first frequency, and wherein the first color pixels in the first and second groups are supplied with a same data voltage when the display apparatus is driven at a second frequency higher than the first frequency.

16. The display apparatus of claim 15, wherein the second color pixels in the first and second groups are supplied with different data voltages when the display apparatus is driven at the first frequency.

17. The display apparatus of claim 15, wherein the third color pixels in the first and second groups are supplied with different data voltages when the display apparatus is driven at the first frequency.

18. The display apparatus of claim 15, wherein the second color pixels in the first and second groups are supplied with the same data voltages when the display apparatus is driven at the second frequency.

19. The display apparatus of claim 15, wherein the third color pixels in the first and second groups are supplied with the same data voltages when the display apparatus is driven at the second frequency.

* * * * *